United States Patent
Chae et al.

(10) Patent No.: US 12,067,708 B2
(45) Date of Patent: Aug. 20, 2024

(54) IMAGE JUDGEMENT APPARATUS, IMAGE JUDGEMENT METHOD AND NON-TRANSITORY COMPUTER READABLE MEDIUM

(71) Applicant: RAKUTEN GROUP, INC., Tokyo (JP)

(72) Inventors: Yeongnam Chae, Tokyo (JP); Preetham Prakasha, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 420 days.

(21) Appl. No.: 17/419,285

(22) PCT Filed: Sep. 8, 2020

(86) PCT No.: PCT/JP2020/033921
§ 371 (c)(1),
(2) Date: Jun. 28, 2021

(87) PCT Pub. No.: WO2022/054124
PCT Pub. Date: Mar. 17, 2022

(65) Prior Publication Data
US 2022/0309648 A1    Sep. 29, 2022

(51) Int. Cl.
*G06K 9/00*        (2022.01)
*G06N 3/045*       (2023.01)
(Continued)

(52) U.S. Cl.
CPC .......... *G06T 7/0006* (2013.01); *G06N 3/045* (2023.01); *G06V 10/774* (2022.01); *G06V 10/82* (2022.01);
(Continued)

(58) Field of Classification Search
None
See application file for complete search history.

(56) References Cited

U.S. PATENT DOCUMENTS 8,315,423 B1 * 11/2012  Jing ................ G06Q 30/0261
                                                        382/181
9,767,381 B2 * 9/2017  Rodríguez-Serrano ..............
                                                          G06N 3/084
(Continued)

FOREIGN PATENT DOCUMENTS

JP    2018169690 A  *  11/2018
JP    2018169690 A     11/2018
(Continued)

OTHER PUBLICATIONS

Girshick et al., "Rich feature hierarchies for accurate object detection and semantic segmentation." In Proceedings of the IEEE conference on computer vision and pattern recognition, pp. 580-587. 2014. (Year: 2014).*
(Continued)

*Primary Examiner* — Feng Niu
(74) *Attorney, Agent, or Firm* — HEA LAW PLLC

(57) ABSTRACT

To easily and correctly determine substantial identity of a plurality of images in each of which an object is placed, provided is an image judgement method including steps of obtaining first object data from a first image with a use of an R-CNN 12, which is a first machine learning model, where the first object data indicates an attribute and a layout of an object in the first image, obtaining second object data from a second image with a use of the R-CNN 12, where the second object data indicates an attribute and a layout of an object in the second image, and determining substantial identity of the first image and the second image based on the first object data and the second object data with a use of a CNN, which is a second machine learning model.

16 Claims, 15 Drawing Sheets

(51) Int. Cl.
*G06T 7/00* (2017.01)
*G06V 10/774* (2022.01)
*G06V 10/82* (2022.01)
*G06N 3/08* (2023.01)

(52) U.S. Cl.
CPC ...... *G06N 3/08* (2013.01); *G06T 2207/20081* (2013.01); *G06T 2207/20084* (2013.01)

(56) References Cited

U.S. PATENT DOCUMENTS

| | | | |
|---|---|---|---|
| 10,210,627 B1* | 2/2019 | Vitsnudel | G06V 30/1914 |
| 10,607,331 B1* | 3/2020 | Tandia | G06V 40/172 |
| 10,748,650 B1* | 8/2020 | Ricci | G16H 30/20 |
| 10,794,710 B1* | 10/2020 | Liu | G06V 20/58 |
| 10,803,602 B2* | 10/2020 | Kim | G06V 10/255 |
| 10,838,601 B2* | 11/2020 | Chen | G06F 3/04883 |
| 10,885,336 B1* | 1/2021 | Davis | G11B 20/00289 |
| 10,902,615 B2* | 1/2021 | Tao | G06F 18/22 |
| 11,100,400 B2* | 8/2021 | Fang | G06N 3/084 |
| 11,113,586 B2* | 9/2021 | Wang | G06N 3/045 |
| 11,288,544 B2* | 3/2022 | Leung | G06F 18/22 |
| 11,308,350 B2* | 4/2022 | Habibian | G06F 18/2113 |
| 11,354,791 B2* | 6/2022 | Tsymbalenko | G06T 5/60 |
| 11,513,670 B2* | 11/2022 | Singh | G06F 17/18 |
| 11,551,348 B2* | 1/2023 | Zhang | G06T 7/0004 |
| 2008/0187170 A1* | 8/2008 | Matsubayashi | G09G 5/003 382/100 |
| 2009/0154765 A1* | 6/2009 | Watanabe | G06F 21/84 708/250 |
| 2011/0273578 A1* | 11/2011 | Okamoto | H04N 23/667 348/222.1 |
| 2014/0099026 A1* | 4/2014 | Krishnaswamy | H04N 1/6086 382/167 |
| 2017/0083792 A1* | 3/2017 | Rodríguez-Serrano | G06V 20/63 |
| 2018/0129906 A1* | 5/2018 | Habibian | G06V 10/764 |
| 2018/0268307 A1* | 9/2018 | Kobayashi | G06N 5/04 |
| 2019/0066313 A1* | 2/2019 | Kim | G06V 10/454 |
| 2019/0147602 A1* | 5/2019 | Tao | G06V 10/809 382/103 |
| 2019/0212903 A1* | 7/2019 | Chen | H04N 21/8153 |
| 2020/0202502 A1* | 6/2020 | Tsymbalenko | G06T 5/60 |
| 2020/0202505 A1* | 6/2020 | Tsai | G09G 3/36 |
| 2020/0242422 A1* | 7/2020 | Wang | G06V 10/7715 |
| 2020/0257940 A1* | 8/2020 | Leung | G06F 18/22 |
| 2020/0327654 A1* | 10/2020 | Zhang | G06N 20/00 |
| 2021/0150243 A1* | 5/2021 | Wang | G06V 10/454 |
| 2021/0166063 A1* | 6/2021 | Nakamura | G06F 18/217 |
| 2021/0333983 A1* | 10/2021 | Singh | G06F 8/38 |
| 2021/0374947 A1* | 12/2021 | Shin | G06V 10/776 |
| 2021/0398407 A1* | 12/2021 | Adato | G06Q 10/06313 |
| 2021/0400195 A1* | 12/2021 | Adato | G06Q 10/06312 |
| 2022/0032457 A1* | 2/2022 | Anand | G06V 40/20 |
| 2022/0067812 A1* | 3/2022 | Song | G06Q 30/0629 |
| 2022/0180485 A1* | 6/2022 | Chen | G06T 7/194 |

FOREIGN PATENT DOCUMENTS

| | | | |
|---|---|---|---|
| JP | 2019219766 A | * | 12/2019 |
| JP | 2019219766 A | | 12/2019 |
| JP | 2020107185 A | * | 7/2020 |
| JP | 2020107185 A | | 7/2020 |

OTHER PUBLICATIONS

Bell et al., "Learning visual similarity for product design with convolutional neural networks." ACM transactions on graphics (TOG) 34, No. 4 (2015): 1-10. (Year: 2016).*

Oksuz et al., "Imbalance problems in object detection: A review." IEEE transactions on pattern analysis and machine intelligence 43, No. 10 (2020): 3388-3415. (Year: 2020).*

Wu et al., "Spot the difference by object detection." arXiv preprint arXiv: 1801.01051 (2018). (Year: 2018).*

Zagoruyko et al., "Learning to compare image patches via convolutional neural networks, " 2015 IEEE Conference on Computer Vision and Pattern Recognition (CVPR), Boston, MA, USA, 2015, pp. 4353-4361. (Year: 2016).*

International Search Report for PCT/JP2020/033921 (See the transmittal letter).

* cited by examiner (a)

| A B C | | TOP | × |
| NO=001 | NO=002 | NO=003 | NO=004 |
| (a) | (b) | (c) | (d) |

FIG.9

| OBJECT NUMBER | TYPE | COLOR |
|---|---|---|
| 001 | LOGO | RED & WHITE |
| 002 | FORM | WHITE & BLACK |
| 003 | BUTTON | GREEN |
| 004 | MARK | YELLOW |

| 1 | $(XA_1,YA_1)$–$(XB_1,YB_1)$ | LOGO, RED & WHITE |
|---|---|---|
| 2 | $(XA_2,YA_2)$–$(XB_2,YB_2)$ | MARK, YELLOW |
| 3 | $(XA_3,YA_3)$–$(XB_3,YB_3)$ | FORM, WHITE & BLACK |

(b)

| 1 | $(XA_1,YA_1)$–$(XB_1,YB_1)$ | FORM, WHITE & BLACK |
|---|---|---|
| 2 | $(XA_2,YA_2)$–$(XB_2,YB_2)$ | BUTTON, GREEN |

IMAGE JUDGEMENT APPARATUS, IMAGE JUDGEMENT METHOD AND NON-TRANSITORY COMPUTER READABLE MEDIUM

CROSS REFERENCE TO RELATED APPLICATIONS

This application is a National Stage of International Application No. PCT/JP2020/033921 filed on Sep. 8, 2020. The contents of the above document is incorporated herein by reference in its entirety.

TECHNICAL FIELD

The present invention relates to an image judgement apparatus, an image judgement method, and a program, and more particularly to a technique for determining substantial identity of a plurality of images.

BACKGROUND ART

In the field of computer technology, a strong need has developed for determining whether a plurality of images, each having an object, are substantially identical. For example, screen images of computer applications are manually designed on a precondition that the images are displayed in a selected single execution environment, such as a particular smartphone. These screen images contain objects such as buttons, images, and input forms. When a design of a screen image for one execution environment is completed, screen images of substantially the same design are also ported to other execution environments. This allows substantially the same screen image to be provided in various execution environments. For example, a screen image designed for a particular smartphone of a particular manufacturer is ported to other smartphones of the same manufacturer or to smartphones of different manufacturers by manual or computer software automated conversion. The screen images thus obtained have often been visually checked for their substantial identity. However, as the number of execution environments for computer applications increases, there is a growing need to automate such verification tasks.

SUMMARY OF INVENTION

Technical Problem

The screen size, aspect ratio, and resolution vary depending on an execution environment of a computer application. Further, objects such as buttons that are provided by the execution environment such as an operation system and included in each screen image differ in appearance to a considerable degree. As such, it is difficult to confirm substantial identity of a plurality of screen images even if the screen images are compared pixel by pixel. Although it is conceivable to input screen images to a machine learning model to determine the substantial identity of the screen images, there is a concern that volume of learning becomes enormous.

In addition to screen images of computer applications, there also exists a strong need to determine the substantial identity of a plurality of images in which objects are arranged, such as page images of electronic books viewed in various environments and web content images viewed in various environments. One or more embodiments of the present invention have been conceived in view of the above, and an object thereof is to provide an image judgement apparatus, an image judgement method, and a program capable of easily and correctly determining substantial identity of a plurality of images in which objects are respectively arranged.

Solution to Problem

In order to solve the above described problems, an image judgement apparatus according to one aspect of the present invention includes object data obtaining means for obtaining first object data from a first image and second object data from a second image with a use of a first machine learning model in which an image is entered and which outputs object data indicating an attribute and a layout of an object in the image, the first object data indicating an attribute and a layout of an object in the first image, the second object data indicating an attribute and a layout of an object in the second image, and determining means for determining substantial identity of the first image and the second image with a use of a second machine learning model in which the first object data and the second object data are entered and which outputs substantial identity of the first image and the second image.

Here, the first machine learning model may include an R-CNN.

The first machine learning model may be trained by a training image that is generated by overlaying one or more objects on a predetermined base image.

Further, the second machine learning model may include fully connected layers.

The second machine learning model may include a convolutional layer and a pooling layer, which reduce dimensionality of input data based on the first object data and the second object data, on an upstream side of the fully connected layers.

The second machine learning model may be trained by first learning object data indicating an attribute and a layout of an object in the first training image and second learning object data indicating an attribute and a layout of an object in the second training image, the first learning object data and the second learning object data being respectively obtained from the first training image and the second training image that are generated by overlaying a predetermined object on each of identical or similar first and second base images according to a predetermined layout rule.

An image judgement method according to one aspect of the present invention includes obtaining first object data from a first image with a use of a first machine learning model, the first object data indicating an attribute and a layout of an object in the first image, obtaining second object data from a second image with a use of the first machine learning model, the second object data indicating an attribute and a layout of an object in the second image, and determining substantial identity of the first image and the second image based on the first object data and the second object data with a use of a second machine learning model.

Here, the first machine learning model may include an R-CNN.

The image judgement method may further include training the first machine learning model by a training image that is generated by overlaying one or more objects on a predetermined base image.

Further, the second machine learning model may include fully connected layers.

The second machine learning model may include a convolutional layer and a pooling layer, which reduce dimensionality of input data based on the first object data and the second object data, on an upstream side of the fully connected layers.

The method may further include overlaying a predetermined object on each of identical or similar first and second base images according to a predetermined layout rule so as to generate a first training image and a second training image, inputting the first training image and the second training image to the first machine learning model so as to obtain first learning object data and second learning object data, the first learning object data indicating an attribute and a layout of an object in the first training image, the second learning object data indicating an attribute and a layout of an object in the second training image, and training the second machine learning model by the first learning object data and the second learning object data.

A program according to still another aspect of the present invention causes a computer to obtain first object data from a first image with a use of a first machine learning model, the first object data indicating an attribute and a layout of an object in the first image, obtain second object data from a second image with a use of the first machine learning model, the second object data indicating an attribute and a layout of an object in the second image, and determine substantial identity of the first image and the second image based on the first object data and the second object data with a use of a second machine learning model. The program may be stored in a computer-readable information storage medium, such as a magneto-optical disk or a semiconductor memory.

BRIEF DESCRIPTION OF THE DRAWINGS

FIG. 8 is a diagram showing examples of object images;

FIG. 9 is a diagram showing an example of an object attribute table;

FIG. 11 is a diagram showing correct answer data corresponding to the training images shown in FIG. 10;

DESCRIPTION OF EMBODIMENTS

Figure 1:
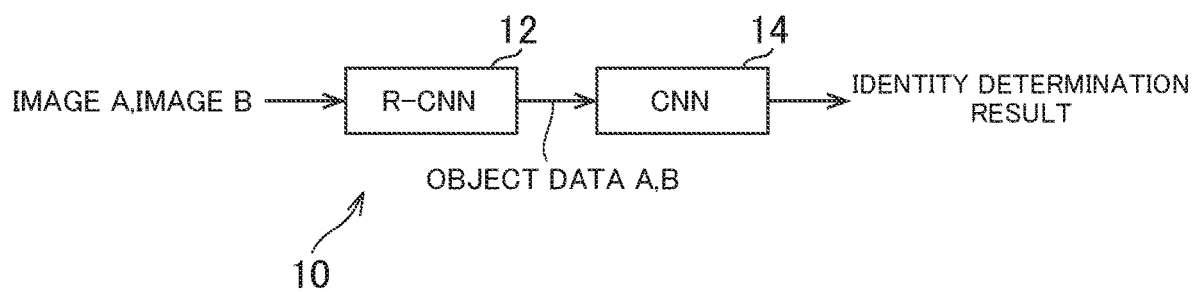
FIG. 1 is a block diagram of an image judgement apparatus according to an embodiment of the present invention.

An embodiment of the present invention will be described below with reference to the accompanying drawings. In the following, the identical components are labeled by the same numerals in the drawings, and description thereof is omitted as appropriate.

FIG. 1 is a functional block diagram of an image judgement apparatus according to an embodiment of the present invention. The functional blocks shown in FIG. 1 are implemented when an image determining program according to an embodiment of the present invention is executed on a computer built around a CPU and a memory. The image judgement apparatus 10 illustrated in FIG. 1 determines substantial identity of two screen images.

The objects, such as buttons, are arranged on the screen images as described above. The image judgement apparatus 10 determines the substantial identity of the two screen images based on the number of objects included in the two screen images, an attribute of each object, and the layout of the objects in the screen images. Here, the attribute of object is, for example, a type and color information of the object. Types of objects include a button, logo image, trademark image, and input form, for example. The color information of the object may be information of one or more representative colors and information of an average color of the object, for example.

Here, two images are "substantially identical" when the number of object images included in each image and respective attributes and layouts of the objects satisfy a predetermined positive example rule. In contrast, two images are "not substantially identical" when the number of object images included in each image and respective attributes and layouts of the objects satisfy a predetermined negative example rule.

Figure 2:
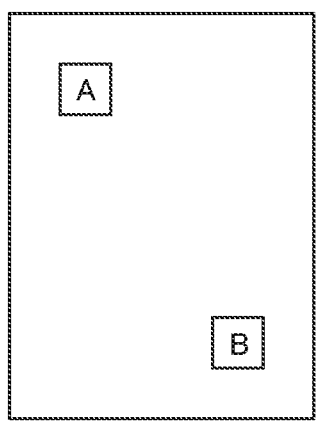
FIG. 2 is a diagram showing an example of identity determination of two screen images.
Figure 2:
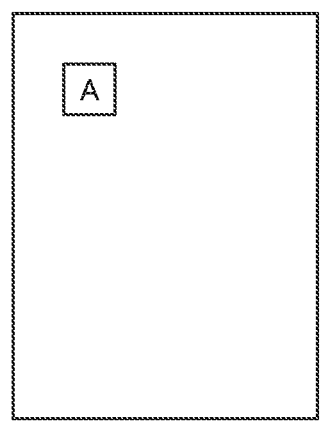
Figure 2:
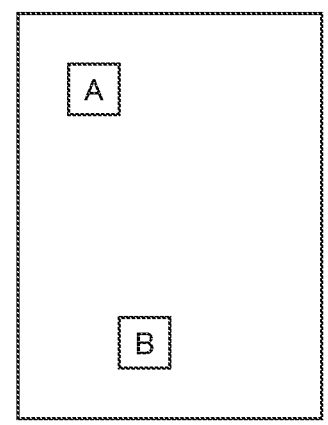
Figure 2:
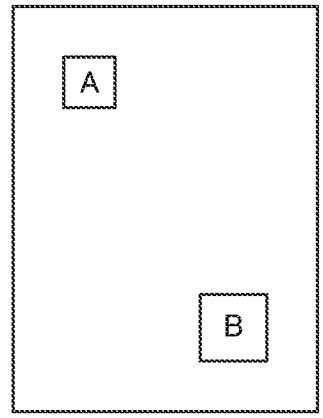
Figure 2:
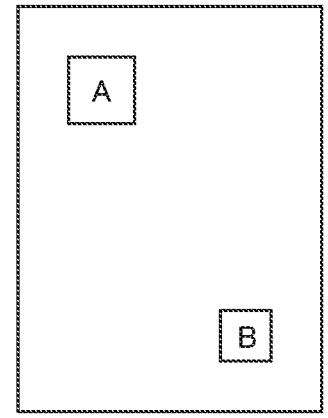

According to the image judgement apparatus 10 shown in FIG. 1, in a case where an object A is disposed in the upper left of the screen image and an object B is arranged in the lower right as shown in FIG. 2(a), it is determined that a screen image with only the object A disposed at the same position and without the object B as shown in FIG. 2(b) is not substantially identical to the screen image shown in FIG. 2(a). That is, the screen images each having different number of objects are determined to be not substantially identical.

As shown in FIG. 2(c), a screen image in which the object A is disposed at the same position but the object B is disposed to be shifted in the horizontal direction is determined to be not substantially identical to the screen image shown in FIG. 2(a). That is, the screen image in which the corresponding object is shifted in the horizontal direction is also determined to be not substantially identical to the screen image shown in FIG. 2(a).

On the other hand, a screen image having a different size of the object B as shown in FIG. 2(d) and a screen image having a different size of the object A as shown in FIG. 2(e) are determined to be substantially identical to the screen image shown in FIG. 2(a). That is, when two screen images are compared, if the number, attributes, and layout of the objects are the same, the two screen images are determined to be substantially identical even if sizes of the object are different.

In order to determine such substantial identity, as shown in FIG. 1, the image judgement apparatus 10 includes an R-CNN (Regions with Convolutional Neural Networks) 12, which is a first machine learning model, and a CNN (Convolutional Neural Networks) 14, which is a second machine learning model. When the screen image A of the two screen images to be compared is entered in the R-CNN 12, object data A indicating the attributes and layout of the objects included in the screen image A is output. When the screen image B of the two screen images is entered in the R-CNN 12, object data B indicating the attributes and layout of the objects included in the screen image B is output. The object data A and the object data B are entered in the CNN 14. The CNN 14 outputs whether the screen image A and the screen image B are substantially identical based on the object data A and the object data B.

Figure 3:
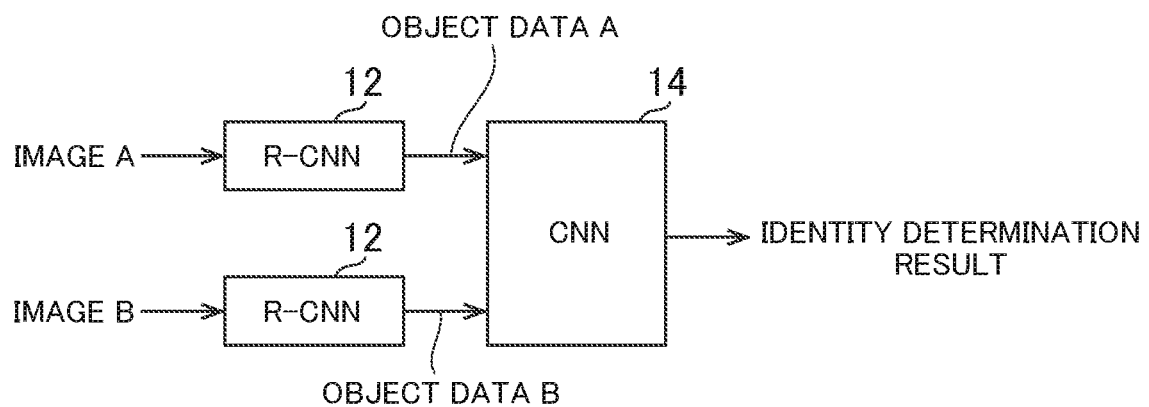
FIG. 3 is a block diagram of an image judgement apparatus according to another embodiment.

Here, the screen image A and the screen image B are sequentially entered in the R-CNN 12 to sequentially obtain the object data A and the object data B. Alternatively, as shown in FIG. 3, two R-CNNs 12 may be provided in parallel at the preceding stage of the CNN 14, and the object data B may be generated from the screen image B in parallel with the generation of the object data A from the screen image A.

In FIG. 1, the R-CNN 12 is a machine learning model for object detection, and may be configured by a known machine learning model for object detection, such as an original R-CNN, Fast R-CNN, Faster R-CNN, and MASK R-CNN. In this embodiment, a Faster R-CNN is used as the R-CNN 12. When an image is entered in the R-CNN 12, object data is output to indicate a layout in the input image and an attribute of each object. The layout of the objects in the input image is specified by, for example, anchor boxes in the object data.

Figure 4:
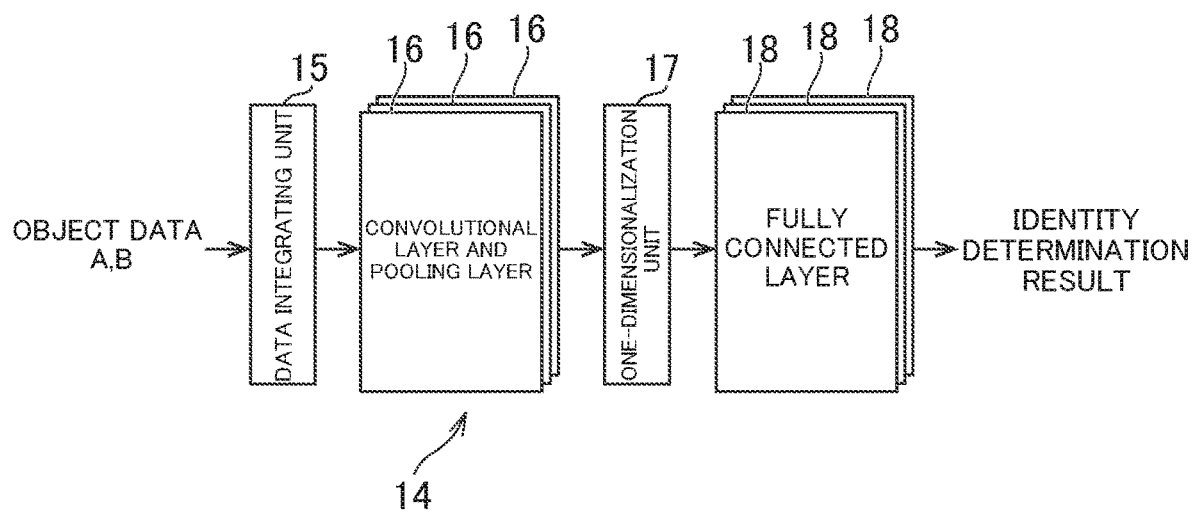
FIG. 4 is a diagram showing an example of a configuration of a CNN.

As shown in FIG. 4, the CNN 14 includes a data integrating unit 15, a plurality of stages of dimension reduction units 16, each of which is configured of a set of convolutional layer and pooling layer, a one-dimensionalization unit 17, and a plurality of stages of fully connected layers 18. The data integrating unit 15 concatenates the object data A and the object data B output from the R-CNN 12 to generate one input data. For example, the object data A and the object data B may be four-dimensional tensor data configured of one dimension indicating the ordinal number of the object (e.g., including 300 pieces of data), two dimensions indicating the size and layout of the object (e.g., each dimension may contain 4 pieces of data), and one dimension indicating the attribute of the object (e.g., including 1024 pieces of data). For example, the data integrating unit 15 may expand the dimension of the ordinal number of the object to twice its size, thereby concatenating the object data A and the object data B to obtain the input data. In this case, the ordinal numbers 1 to 300 of the objects are assigned objects included in the screen image A, and the ordinal numbers 301 to 600 of the objects are assigned objects included in the screen image B.

The input data generated by the data integrating unit 15 is dimensionally reduced by a plurality of stages of the dimension reduction units 16, and two-dimensional intermediate data is output from the last stage of the dimension reduction units 16. The one-dimensionalization unit 17 one-dimensionalizes the intermediate data, and inputs the one-dimensionalized intermediate data to the first stage of the fully connected layers 18. The last stage of the fully connected layers 18 outputs a one-dimensional (may include two pieces of data) identity determination result from the one-dimensionalized intermediate data. The identity determination result includes the data indicating the degree of identity of the screen image A and the screen image B and the data indicating the degree of non-identity.

According to the CNN 14 shown in FIG. 4, it is possible to determine whether the screen image A and the screen image B are substantially identical based on the attributes and the layout of the objects respectively included in the screen image A and the screen image B.

In FIG. 4, the object data A and the object data B are concatenated to obtain input data and the input data is dimensionally reduced, although each of the object data A and the object data B may be dimensionally reduced. That is, as in the CNN 14 shown in FIG. 5, the object data A may be dimensionally reduced by the plurality of stages of the dimension reduction units 16a, each including the convolution layer and the pooling layer, and the object data B may be dimensionally reduced by the dimension reduction units 16b having the same function as the dimension reduction units 16a in parallel with the dimension reduction of the object data A. The outputs of the dimension reduction units 16a and 16b are two-dimensional intermediate data, and the data integrating unit 19 converts each intermediate data into one-dimensional data and concatenates the data so as to output one one-dimensional data. The intermediate data output from the data integrating unit 19 is entered into the plurality of stages of fully connected layers 18, and the identity determination result is output from the last stage.

Figure 5:
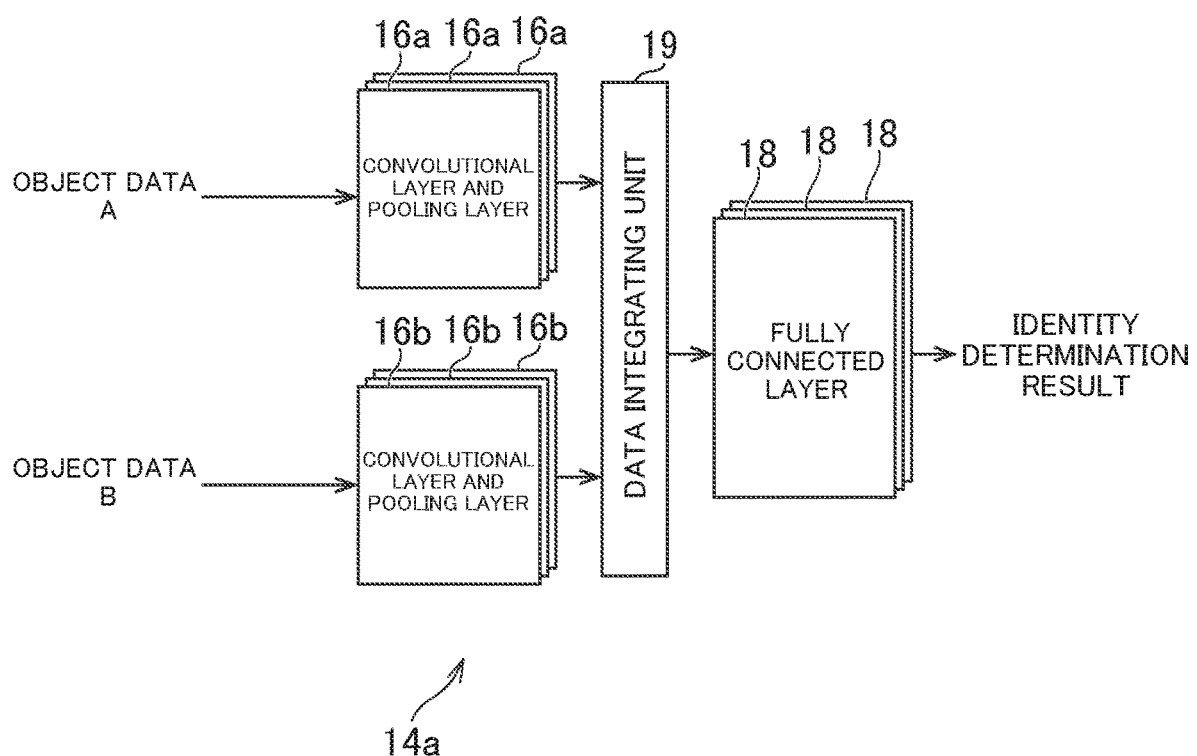
FIG. 5 is a diagram showing an example of another configuration of the CNN.

With the use of the CNN 14 shown in FIG. 5, it is also possible to determine whether the screen image A and the screen image B are substantially identical based on the attributes and the layouts of the objects respectively included in the screen image A and the screen image B.

Here, the learning of the R-CNN 12 and the CNN 14 will be described.

Figure 6:
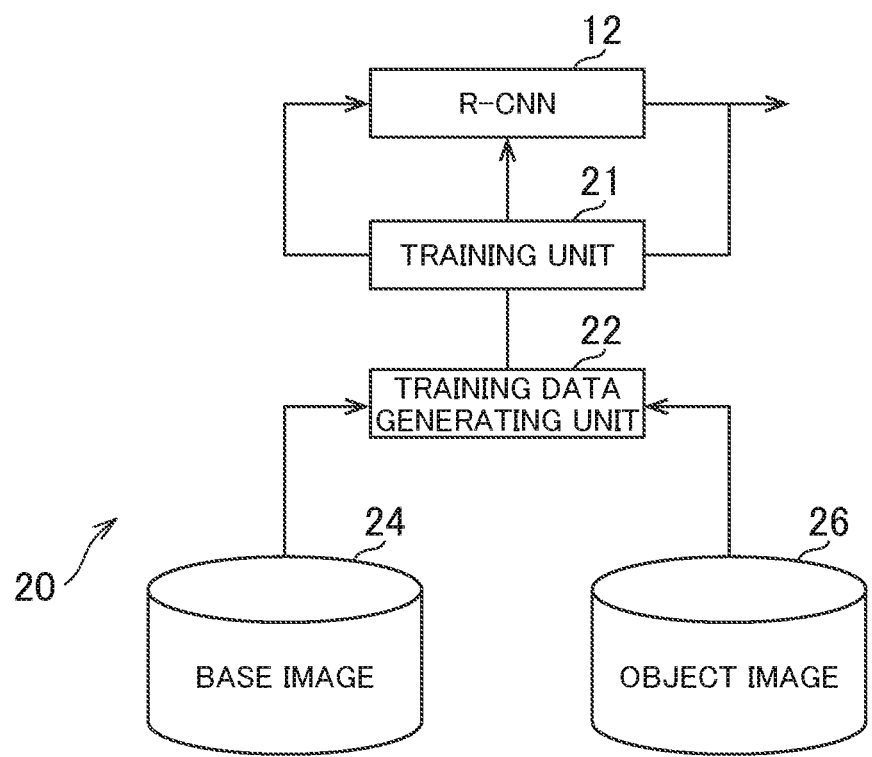
FIG. 6 is a block diagram of a training device used for training an R-CNN.

FIG. 6 is a diagram showing a configuration of a training device 20 that trains the R-CNN 12. The functional blocks shown in FIG. 6 are implemented when a program related to an embodiment of the present invention is executed on a computer built around a CPU and a memory. As shown in FIG. 6, the training device 20 includes a training unit 21 that updates inner parameters of the R-CNN 12 to train the R-CNN 12, a training data generating unit 22 that generates training data used for training the R-CNN 12, a base image storage unit 24 that stores a base image used for generating training data, and an object image storage unit 26 that stores an object image also used for generating training data.

Figure 7:
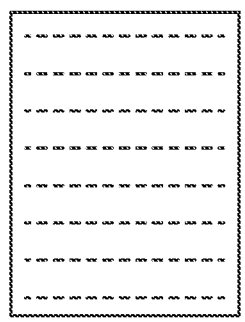
FIG. 7 is a diagram showing examples of base images.
Figure 7:
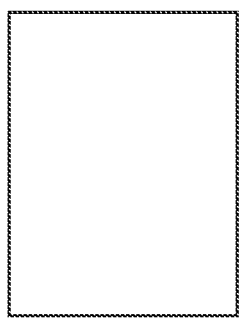
Figure 7:
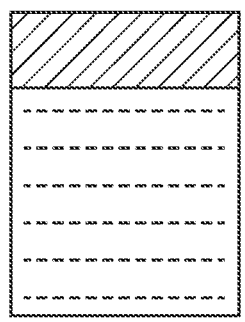
Figure 7:
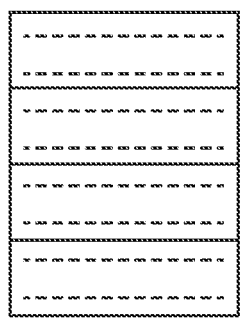

FIG. 7 shows examples of base images stored in the base image storage unit 24. The base image is image data in a raster format to be a basis of a screen image, and FIG. 7(a) shows a base image in which text is entirely displayed. FIG. 7(b) shows a plain white base image. FIG. 7(c) shows a base image configured of a solid-color upper portion and a lower portion in which text is displayed. FIG. 7(d) shows a base image that is divided into a plurality of blocks, in each of which text is displayed. The base image storage unit 24 stores a large number of such raster-format base images.

Figure 8:
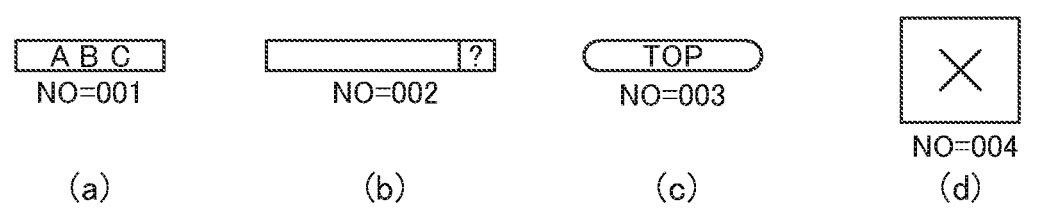

FIG. 8 shows examples of object images stored in the object image storage unit 26. The object image is raster-format image data to be a basis of a screen image, and has an appearance of an object placed in the screen image, such as a button and an input form. FIG. 8(a) shows a logo image, which is a type of object image. The object number "001" is assigned to the object image shown in FIG. 8(a). FIG. 8(b) shows an input form image, which is a type of object image. The object number "002" is assigned to the object image shown in FIG. 8(b). FIG. 8(c) shows a button image, which is a type of object image. The object number "003" is assigned to the object image shown in FIG. 8(c). FIG. 8(d) shows a trademark image, which is a type of object image. The object number "004" is assigned to the object image shown in FIG. 8(d). The object image storage unit 26 stores a large number of such raster-format object images.

The object image storage unit 26 stores an object attribute table shown in FIG. 9 in addition to a large number of object images. The object attribute table stores attributes of respective object images stored in the object image storage unit 26. Specifically, the object attribute table stores types and color information of the object images in association with object numbers respectively corresponding to the object images. For example, the object attribute table stores the type "logo" and the color information "red and white" of the object image in association with the object number "001" of the object image shown in FIG. 8(a).

The training data generating unit 22 generates a large number of training data based on the data stored in the base image storage unit 24 and the object image storage unit 26. The training data includes training images and correct answer data.

Figure 10:
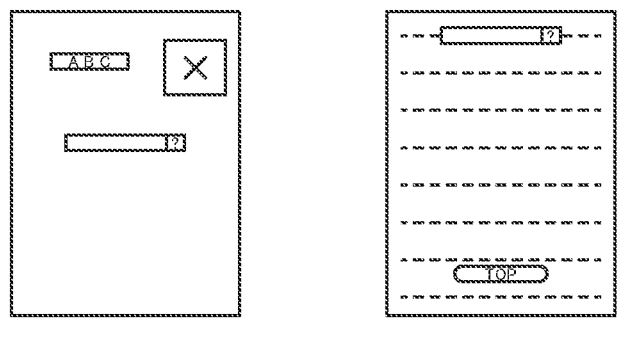
FIG. 10 is a diagram showing examples of training images.

FIG. 10 shows examples of training images generated by the training data generating unit 22. The training image shown in FIG. 10(a) is generated by overlaying the object image shown in FIG. 8(a), the object image shown in FIG. 8(d), and the object image shown in FIG. 8(b) on the base image shown in FIG. 7(b). The training image shown in FIG. 10(b) is generated by overlaying the object image shown in FIG. 8(b) and the object image shown in FIG. 8(c) on the base image shown in FIG. 7(a).

A base image used for generating a training image is randomly selected by the training data generating unit 22 from a large number of base images stored in the base image storage unit 24. An object image to be overlaid on the base image is also randomly selected by the training data generating unit 22 from a large number of object images stored in the object image storage unit 24. Further, the layout (position and size) of the object images is also randomly determined by the training data generating unit 22.

FIG. 11 shows an example of correct answer data generated by the training data generating unit 22. FIG. 11(a) shows correct answer data for the training image shown in FIG. 10(a). Such correct answer data indicates that the training image contains three object images, the layout of the first object image is "(XA1,YA1)-(XB1,YB1)" and the attribute is "logo, red, white", the layout of the second object image is "(XA2,YA2)-(XB2,YB2)" and the attribute is "mark, yellow", and the layout of the third object image is "(XA3,YA3)-(XB3,YB3)" and the attribute is "form, white, black." That is, the correct answer data indicates the number of object images included in the training image and the layout and attributes of the respective object images. Similarly, FIG. 11(b) shows the correct answer data for the training image shown in FIG. 10(b).

When generating a training image, the training data generating unit 22 randomly selects an object image to overlay on a base image and also randomly determines the layout of the object image. The training data generating unit 22 reads the attribute of the selected object image from the object attribute table shown in FIG. 9 and includes the attribute in the correct answer data shown in FIG. 11. The training data generating unit 22 also includes the determined layout of the object image in the correct answer data shown in FIG. 11, thereby generating the correct answer data corresponding to the training image.

The training unit 21 executes a training process of the R-CNN 12 by using the training data generated by the training data generating unit 22. Specifically, the training unit 21 sequentially inputs the training images included in the training data to the R-CNN 12 so as to obtain the output of the object data. The difference between the output and the correct answer data included in the training data is calculated, and the internal parameters of the R-CNN 12 are updated so as to reduce such a difference.

Figure 12:
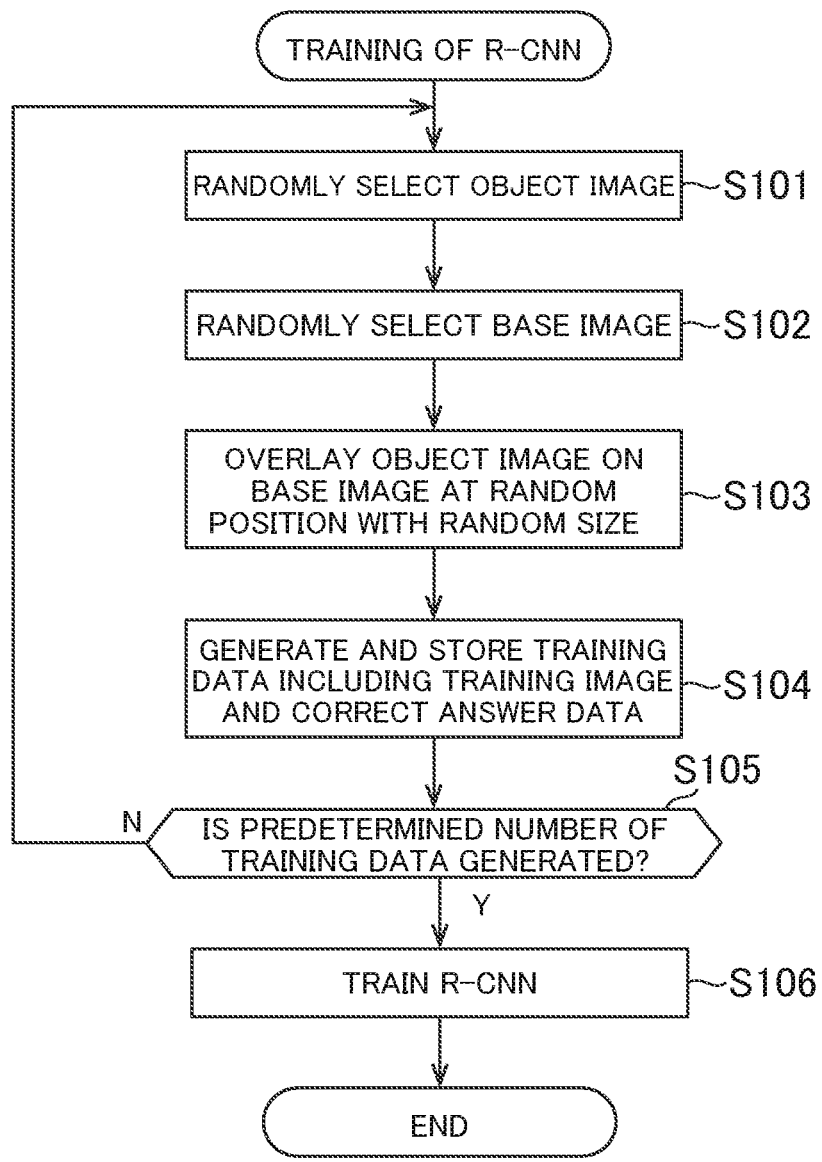
FIG. 12 is a flow chart showing a training process of the R-CNN.

FIG. 12 is an operational flow chart of the training device 20. In the training device 20, the training data generating unit 22 randomly selects an object image stored in the object image storage unit 26 (S101). Here, the number of object images to be selected is also randomly determined. Subsequently, the training data generating unit 22 randomly selects one base image from the base image storage unit 24 (S102).

The training data generating unit 22 disposes the selected object images on the selected base image, thereby generating a training image (S103). At this time, the training data generating unit 22 randomly determines a position and a size of each object image.

The training data generating unit 22 further generates correct answer data illustrated in FIG. 11 in accordance with the processing in S101 to S103, and includes the generated correct answer data in the training data together with the training image generated in S103 (S104).

After repeating the processing in S101 to S104 until a predetermined number of pieces of training data are generated (S105), the training unit 21 executes the training process of the R-CNN 12 using the generated training data (S106).

Figure 13:
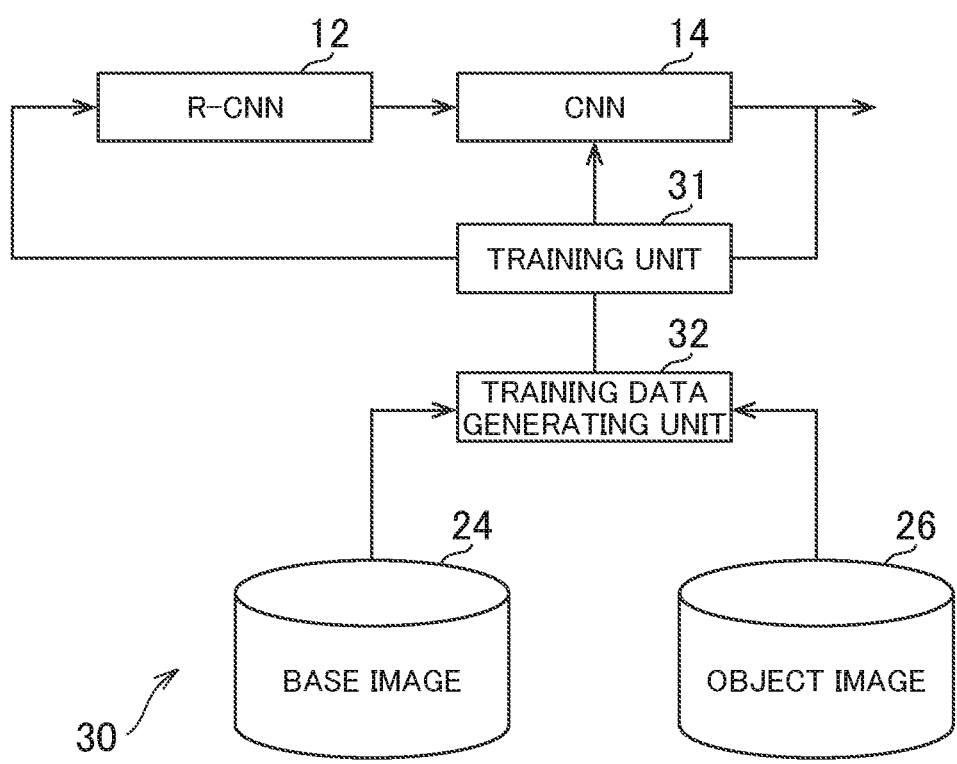
FIG. 13 is a block diagram of a training device used for training the CNN.

Next, FIG. 13 is a diagram showing a configuration of a training device 30 that trains the CNN 14. The functional blocks shown in FIG. 13 are implemented when a program related to an embodiment of the present invention is executed on a computer built around a CPU and a memory. As shown in FIG. 13, the training device 30 includes a training unit 31 that updates the inner parameters of the CNN 14 to train the CNN 14, a training data generating unit 32 that generates training data used for training the CNN 14, a base image storage unit 24, and an object image storage unit 26. The training data generating unit 32 uses base images stored in the base image storage unit 24 and object images stored in the object image storage unit 26 to generate training data relating to positive and negative examples. Each training data includes a positive example, i.e., a pair of substantially identical training images, or a negative example, i.e., a pair of substantially non-identical training images.

Figure 14:
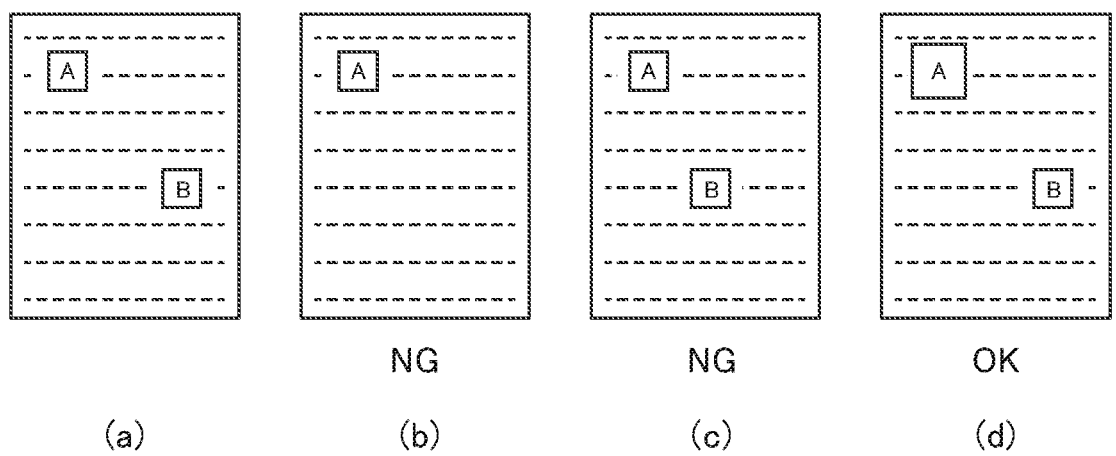
FIG. 14 is a diagram showing training data relating to positive and negative examples used for training of the CNN.

FIG. 14 is a diagram showing training images according to positive and negative examples to be used for training the CNN 14. FIG. 14(a) shows an example of one of a pair of training images. The one training image is generated by disposing a plurality of randomly selected object images at random positions and in random sizes on a randomly selected base image. In FIG. 14(a), the object images A and B are disposed on the base image in which the text is entirely displayed.

FIG. 14(b) shows the other training image generated by applying the first negative example rule. In the first negative example rule, a part of the object images included in the one training image is removed. For example, unlike the training image of FIG. 14(a), the training image of FIG. 14(b) does not include the object image B.

FIG. 14(c) shows the other training image generated by applying the second negative example rule. In the second negative example rule, a part of the object images included in the one training image is moved horizontally. For example, in the training image of FIG. 14(c), the object image B is shifted leftward as compared with the training image of FIG. 14(a).

FIG. 14(d) shows the other training image generated by applying the positive example rule. In the positive example rule, a part of the object images included in one training image is enlarged or reduced. For example, in the training image of FIG. 14(d), the object image A is enlarged as compared with the training image of FIG. 14(a).

The training unit 31 executes a training process of the CNN 14 by using the training data generated as described above. Specifically, two training images included in the training data are sequentially entered into the R-CNN 12 to obtain two pieces of object data. The obtained object data is entered into the CNN 14. The training unit 31 obtains the identity determination result that is output from the CNN 14, and updates the inner parameters of the CNN 14 so that the identity determination result is correct. That is, when the training image relating to the positive example is entered into the R-CNN 12, the inner parameters are updated so as to indicate that the identity determination result from the CNN 14 is substantially identical. In contrast, when the training image relating to the negative example is entered into the R-CNN 12, the inner parameters are updated so as to indicate that the identity determination result from the CNN 14 is not substantially identical.

Figure 15:
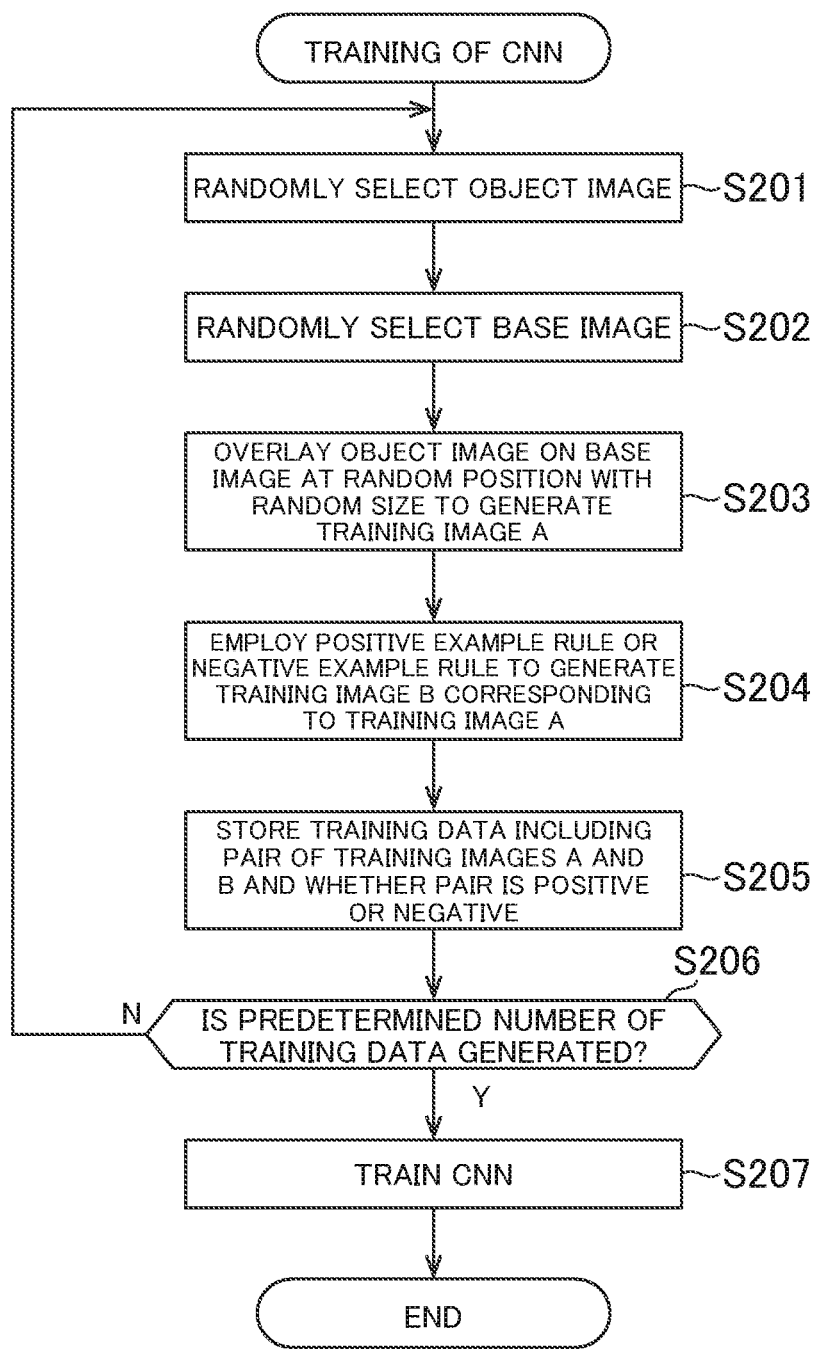
FIG. 15 is a flow chart indicating a training process of the CNN.

FIG. 15 is an operational flow chart of the training device 30. As shown in FIG. 15, in the training device 30, the training data generating unit 32 randomly selects object images from the object image storage unit 26 (S201). Further, the training data generating unit 32 randomly selects a base image from the base image storage unit 24 (S202). The training data generating unit overlays the object images on the selected base image to generate a training image A (S203). At this time, a position and a size of each object image are randomly determined.

Next, the training data generating unit 32 employs the positive example rule or the negative example rule and overlays all or some of the selected object images on the selected base image, thereby generating a training image B (S204). For example, if the first negative example rule is used, the training image B is generated without overlaying a part of the selected object images on the selected base image. If the second negative example rule is used, a part of the selected object images is moved rightward or leftward and then overlaid on the selected base image so as to generate the training image B. If the positive example rule is used, a part of the selected object images is enlarged or reduced and then overlaid on the selected base image so as to generate the training image B.

Subsequently, the training data generating unit 32 generates training data including the generated pair of training image A and training image B and whether the pair is positive example or negative example, and stores the generated training data (S205).

After repeating the processing in S201 to S205 until a predetermined number of pieces of training data are generated (S206), the training unit 31 executes the training process of the CNN 14 using the generated training data (S207).

According to the image judgement apparatus 10 described above, it is possible to obtain, from each of two screen images to be compared, object data indicating the attributes and positions of the object images included in the two screen images. Based on the two pieces of object data, the substantial identity of the two screen images is determined. For determining the substantial identity, the CNN 14 is trained in advance using a large number of training image pairs generated according to the positive and negative example rules. According to the present embodiment, the substantial identity of the two screen images can be suitably determined.

Specifically, the inventors of the present invention generated 5000 pieces of training data for the R-CNN 12 and 8000 pieces of training data for the CNN 14 by using 500 base images and 33 types of object images, and trained the R-CNN 12 and the CNN 14. As a result, it was found that the accuracy of determination of the substantial identity of the screen images was about 86%, which is sufficiently practical.

The scope of the present invention is not limited to the above embodiment, and includes various modifications. For example, the present invention may be applied not only to a screen image but also to various images, such as a page image of an electronic book and a web content image.

The invention claimed is:

1. An image judgement apparatus comprising:
   one or more processors;
   a memory storing instructions which, when executed by said one or more processor, cause said one or more processors to perform operations comprising:
   obtaining first object data from a first image and second object data from a second image with a use of a first machine learning model in which an image is entered and which outputs object data indicating an attribute and a layout of an object in the image, the first object data indicating an attribute and a layout of an object in the first image, the second object data indicating an attribute and a layout of an object in the second image;
   determining whether the first image and the second image are substantially identical with a use of a second machine learning model in which the first object data and the second object data are entered and which outputs whether the first image and the second image are substantially identical;
   wherein the first image and the second image are substantially identical if a number of objects included in the first image and the second image, the respective attributes of the objects included in the first image and the second image, and the layout of the objects included in the first image and the second image satisfy a predetermined positive example rule;
   wherein the first image is a screen image which is displayed by a computer application for a first execution environment;
   wherein the second image is a screen image which is displayed by a computer application for a second execution environment; and
   wherein the second execution environment is different from the first execution environment.

2. The image judgement apparatus according to claim 1, wherein
   the first machine learning model includes an R-CNN.

3. The image judgement apparatus according to claim 1, wherein
   the first machine learning model is trained by a training image that is generated by overlaying one or more objects on a predetermined base image.

4. The image judgement apparatus according to claim 1, wherein
   the second machine learning model includes fully connected layers.

5. The image judgement apparatus according to claim 4, wherein
   the second machine learning model includes a convolutional layer and a pooling layer, which reduce dimensionality of input data based on the first object data and the second object data, on an upstream side of the fully connected layers.

6. The image judgement apparatus according to claim 4, wherein the second machine learning model is trained by first learning object data indicating an attribute and a layout of an object in a first training image and second learning object data indicating an attribute and a layout of an object in a second training image, the first learning object data and the second learning object data being respectively obtained from the first training image and the second training image that are generated by overlaying a predetermined object on each of identical or similar a first base image and a second base image according to a predetermined layout rule.

7. An image judgement method comprising:
obtaining first object data from a first image with a use of a first machine learning model, the first object data indicating an attribute and a layout of an object in the first image;
obtaining second object data from a second image with a use of the first machine learning model, the second object data indicating an attribute and a layout of an object in the second image;
determining whether the first image and the second image are substantially identical based on the first object data and the second object data with a use of a second machine learning model,
wherein the first image and the second image are substantially identical if a number of objects included in the first image and the second image, the respective attributes of the objects included in the first image and the second image, and the layout of the objects included in the first image and the second image satisfy a predetermined positive example rule;
wherein the first image is a screen image which is displayed by a computer application for a first execution environment;
wherein the second image is a screen image which is displayed by a computer application for a second execution environment; and
wherein the second execution environment is different from the first execution environment.

8. The image judgement method according to claim 7, wherein
the first machine learning model includes an R-CNN.

9. The image judgement method according to claim 7 further comprising training the first machine learning model by a training image that is generated by overlaying one or more objects on a predetermined base image.

10. The image judgement method according to claim 7, wherein
the second machine learning model includes fully connected layers.

11. The image judgement method according to claim 10, wherein
the second machine learning model includes a convolutional layer and a pooling layer, which reduce dimensionality of input data based on the first object data and the second object data, on an upstream side of the fully connected layers.

12. The image judgement method according to claim 10 further comprising:
overlaying a predetermined object on each of identical or similar a first base image and a second base image according to a predetermined layout rule so as to generate a first training image and a second training image;
inputting the first training image and the second training image to the first machine learning model so as to obtain first learning object data and second learning object data, the first learning object data indicating an attribute and a layout of an object in the first training image, the second learning object data indicating an attribute and a layout of an object in the second training image; and
training the second machine learning model by the first learning object data and the second learning object data.

13. A non-transitory computer-readable information storage medium storing a program for causing a computer to:
obtain first object data from a first image with a use of a first machine learning model, the first object data indicating an attribute and a layout of an object in the first image;
obtain second object data from a second image with a use of the first machine learning model, the second object data indicating an attribute and a layout of an object in the second image;
determine whether the first image and the second image are substantially identical based on the first object data and the second object data with a use of a second machine learning model;
wherein the first image and the second image are substantially identical if a number of objects included in the first image and the second image, the respective attributes of the objects included in the first image and the second image, and the layout of the objects included in the first image and the second image satisfy a predetermined positive example rule;
wherein the first image is a screen image which is displayed by a computer application for a first execution environment;
wherein the second image is a screen image which is displayed by a computer application for a second execution environment; and
wherein the second execution environment is different from the first execution environment.

14. An image judgement apparatus comprising:
one or more processors;
a memory storing instructions which, when executed by said one or more processor, cause said one or more processors to perform operations comprising:
obtaining first object data from a first image and second object data from a second image with a use of a first machine learning model in which an image is entered and which outputs object data indicating an attribute and a layout of an object in the image, the first object data indicating an attribute and a layout of an object in the first image, the second object data indicating an attribute and a layout of an object in the second image;
determining whether the first image and the second image are substantially identical with a use of a second machine learning model in which the first object data and the second object data are entered and which outputs whether the first image and the second image are substantially identical;
wherein the first image and the second image are substantially identical if a number of objects included in the first image and the second image, the respective attributes of the objects included in the first image and the second image, and the layout of the objects included in the first image and the second image satisfy a predetermined positive example rule;
wherein the second machine learning model includes fully connected layers;
wherein the second machine learning model is trained by first learning object data indicating an attribute and a layout of an object in a first training image and second learning object data indicating an attribute and a layout of an object in a second training image, the first learning object data and the second learning object data being respectively obtained from the first training image and the second training image that are generated by overlaying a predetermined object on each of identical or similar a first base image and a second base image according to a predetermined layout rule;

wherein the first training image is generated by overlaying the predetermined object at a predetermined position and in a predetermined size on the first base image;

wherein the second training image is generated without overlaying the predetermined object on the second base image; and wherein the second machine learning model is trained that the first training image and the second training image are not substantially identical.

15. An image judgement apparatus comprising:

one or more processors;

a memory storing instructions which, when executed by said one or more processor, cause said one or more processors to perform operations comprising:

obtaining first object data from a first image and second object data from a second image with a use of a first machine learning model in which an image is entered and which outputs object data indicating an attribute and a layout of an object in the image, the first object data indicating an attribute and a layout of an object in the first image, the second object data indicating an attribute and a layout of an object in the second image;

determining whether the first image and the second image are substantially identical with a use of a second machine learning model in which the first object data and the second object data are entered and which outputs whether the first image and the second image are substantially identical;

wherein the first image and the second image are substantially identical if a number of objects included in the first image and the second image, the respective attributes of the objects included in the first image and the second image, and the layout of the objects included in the first image and the second image satisfy a predetermined positive example rule;

wherein the second machine learning model includes fully connected layers;

wherein the second machine learning model is trained by first learning object data indicating an attribute and a layout of an object in a first training image and second learning object data indicating an attribute and a layout of an object in a second training image, the first learning object data and the second learning object data being respectively obtained from the first training image and the second training image that are generated by overlaying a predetermined object on each of identical or similar a first base image and a second base image according to a predetermined layout rule;

wherein the first training image is generated by overlaying the predetermined object at a predetermined position and in a predetermined size on the first base image;

wherein the second training image is generated by overlaying at a different position from the predetermined position on the second base image; and wherein the second machine learning model is trained that the first training image and the second training image are not substantially identical.

16. An image judgement apparatus comprising:

one or more processors;

a memory storing instructions which, when executed by said one or more processor, cause said one or more processors to perform operations comprising:

obtaining first object data from a first image and second object data from a second image with a use of a first machine learning model in which an image is entered and which outputs object data indicating an attribute and a layout of an object in the image, the first object data indicating an attribute and a layout of an object in the first image, the second object data indicating an attribute and a layout of an object in the second image;

determining whether the first image and the second image are substantially identical with a use of a second machine learning model in which the first object data and the second object data are entered and which outputs whether the first image and the second image are substantially identical;

wherein the first image and the second image are substantially identical if a number of objects included in the first image and the second image, the respective attributes of the objects included in the first image and the second image, and the layout of the objects included in the first image and the second image satisfy a predetermined positive example rule;

wherein the second machine learning model includes fully connected layers;

wherein the second machine learning model is trained by first learning object data indicating an attribute and a layout of an object in a first training image and second learning object data indicating an attribute and a layout of an object in a second training image, the first learning object data and the second learning object data being respectively obtained from the first training image and the second training image that are generated by overlaying a predetermined object on each of identical or similar a first base image and a second base image according to a predetermined layout rule;

wherein the first training image is generated by overlaying the predetermined object at a predetermined position and in a predetermined size on the first base image;

wherein the second training image is generated by overlaying in a different size from the predetermined size on the second base image; and wherein the second machine learning model is trained that the first training image and the second training image are substantially identical.

* * * * *